Figure 1:
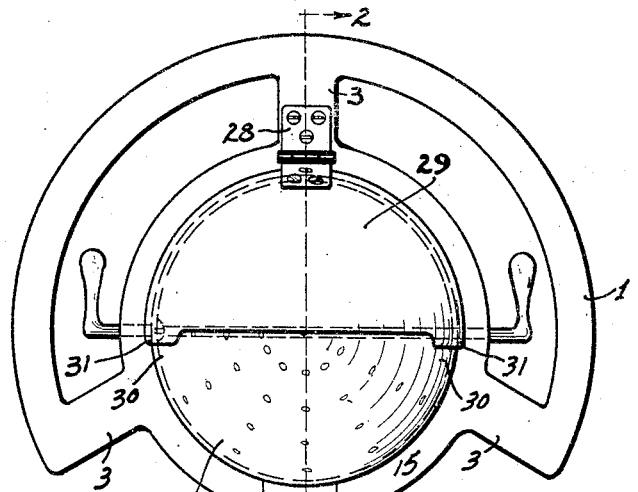

C. E. BROOKS.
LAWN SPRINKLER.
APPLICATION FILED FEB. 15, 1919.

1,380,464.

Patented June 7, 1921.

INVENTOR
CHARLES E BROOKS
BY C. T. Enochs
ATTORNEY

UNITED STATES PATENT OFFICE.

CHARLES E. BROOKS, OF MINNEAPOLIS, MINNESOTA.

LAWN-SPRINKLER.

1,380,464.              Specification of Letters Patent.      Patented June 7, 1921.

Application filed February 15, 1919. Serial No. 277,688.

*To all whom it may concern:*

Be it known that I, CHARLES E. BROOKS, a citizen of the Dominion of Canada, and a resident of Minneapolis, in the county of Hennepin and State of Minnesota, have invented certain new and useful Improvements in Lawn-Sprinklers, of which the following is a specification.

One object of my invention is to provide, in a lawn sprinkler, a series of apertures for the discharging of water therethrough, so positioned with respect to each other as to most advantageously sprinkle a maximum area of lawn.

Another object of my invention is to provide, in a lawn sprinkler, a unique construction that is easy and economical to manufacture, and that will provide a lawn sprinkler with a minimum amount of plugging up of the apertures through which the water is discharged.

Another object of my invention is to provide means for shutting off a portion of the sprinkler when desired.

With these and incidental objects in view, the invention consists of certain novel features of construction and combination of parts, the essential elements of which are hereinafter described with reference to the drawing which accompanies and forms a part of this specification.

Figure 2:
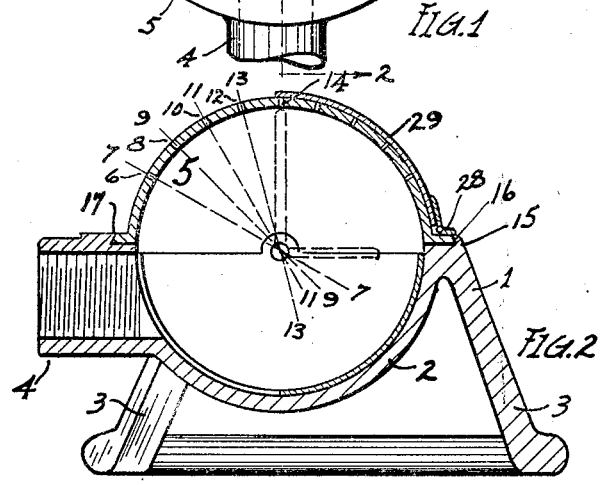
Figure 3:
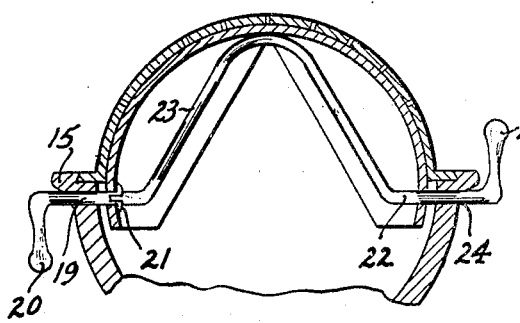
Figure 4:
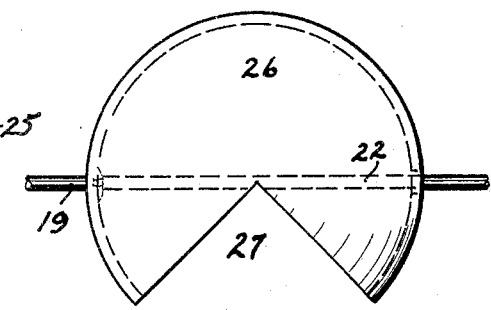

In the drawing, Figure 1 is a plan view of my improved sprinkler; Fig. 2 is a view taken on the line 2—2, Fig. 1; Fig. 3 is a sectional detail showing the manner of mounting the shut off sleeve, and Fig. 4 is a detail of the inner shut off sleeve.

The base 1, Fig. 1, is preferably made of a simple casting, and carries a bowl 2 supported on the legs 3.

The boss 4 is suitably threaded to receive a hose connection, and the hemispherical cap or bowl 5 is firmly joined to the bowl 2 so as to form therewith a substantial spherical chamber.

Apertures 6, which are spaced about the bowl 5, point outwardly at the angle indicated by the line 7—7. Similarly, apertures 8 point outwardly from the bowl 5 on the angle as indicated by the line 9—9; apertures 10 as indicated by the line 11—11; apertures 12 as indicated by the line 13—13; while the aperture 14 discharges directly vertical.

The water discharged by these various apertures is, on account of the angle at which the apertures are positioned in the cap, spread in four concentric circles, so that substantially the entire area of a circle whose center is in the vertical line of the aperture 14, and whose perimeter is bounded by the farthest discharged water through the apertures 7, is uniformly sprinkled by the device.

Looking at Fig. 2, it will be seen that the base 1 has the upper portion of the bowl 2, or collar 15, undercut about its perimeter, as indicated at 16. With the base so fashioned, the cap 5 is placed therein, and, as this cap is first made up, it has a lip or projection 17 formed therein adapted to pass within the undercut portion 16 of the rim 15.

A swaging roller is then passed around the shoulder of the cap at 17, and the material from which the cap 5 is formed is rolled and pressed outwardly so as to completely fill the undercut recess 16 and join the cap to the rim 15 with a solid watertight connection.

On account of this method of rolling the cap into the base, I prefer to construct the cap of a somewhat ductile metal, and because the cap should be of a material that will not readily oxidize, I prefer to use, for forming the cap, aluminum, lead, Babbitt, or some such substance.

As it is sometimes desirable to be able to place a lawn sprinkler close to a walk or other surface that should not be sprinkled, I journal a pin 19 in the collar 15, the pin being bent at its outer end into a lever 20.

Pivotally connected in the inner end of the pin at 21 is a shaft 22 having an upstanding arch 23 therein, the opposite end of the shaft being journaled at 24 in the collar 15 and having a lever 25 formed therein.

An inner shut off shell 26 is journaled on the pin 19 at the one end, and on the shaft 22 at the other end, and rigidly attached to the pin 19, so that by turning the lever 20 this shell may be rotated about its axis.

Looking at Fig. 4, it will be seen that if this shell 26 is turned upwardly 180 degrees from the position shown in Fig. 2, all of the apertures will be shut off except those exposed through the cut away portion 27 of the shell 26.

To make the joint between the shell 26 and the cap 5 more nearly water-tight, it is only necessary to turn the lever 25, Fig. 2, so that the upstanding arch 23 will press the shell 26 tightly against the interior surface of the cap 5.

Hinged to the collar 15 at 28, Fig. 1, is an outer shell 29, adapted to be closed against the cap 5 and completely shut off the apertures thus covered.

The cap 5 is dented in slightly at 30, Fig. 1, and the shell 29 has its lips 31 formed inwardly so as to register with the depression 30 of the cap 5 and hold the shell firmly against the cap 5 when it is pressed downwardly in the position shown in Fig. 2.

It is evident that either inside or outside shell may be used independently, or that both may be used in the same sprinkler, and by means of these devices I am able to sprinkle practically any particular shape of lawn desired.

While I have described my invention and illustrated it in one particular design, I do not wish it understood that I limit myself to this construction, as it is evident that the application of the invention may be varied in many ways within the scope of the following claim:

Claim:

In a lawn sprinkler the combination of a base, a bowl of general hemispherical shape projecting upwardly therefrom and having a series of apertures therein, an inner shell of general hemispherical shape, but having a portion thereof cut away, positioned within said bowl and journaled therein to allow rotation therewith so as to shut off a greater or lesser portion of the apertures of said bowl, and an outer shell of general quarter-spherical shape hinged to said base and adapted to shut off substantially half of the apertures of said bowl when swung against the outer surface of said bowl.

CHARLES E. BROOKS.